United States Patent [19]
Holton

[11] Patent Number: 6,021,598
[45] Date of Patent: Feb. 8, 2000

[54] POURABLE GRANULAR PAPER MULCH COMPOSITION

[75] Inventor: Charles J. Holton, Haslett, Mich.

[73] Assignee: Ampro Industries, Inc., Bradley, Mich.

[21] Appl. No.: 08/994,774

[22] Filed: Dec. 19, 1997

[51] Int. Cl.$^7$ ........................................... A01G 7/00
[52] U.S. Cl. ........................................... 47/9; 119/172
[58] Field of Search ................... 47/9; 119/172; 502/7, 401

[56] References Cited

U.S. PATENT DOCUMENTS

| | | |
|---|---|---|
| 2,708,418 | 5/1955 | Sugar et al. . |
| 3,269,824 | 8/1966 | Aswell . |
| 3,828,731 | 8/1974 | White . |
| 4,067,140 | 1/1978 | Thomas . |
| 4,278,047 | 7/1981 | Luca . |
| 4,409,925 | 10/1983 | Brundrett et al. . |
| 4,458,629 | 7/1984 | Gerber . |
| 4,570,573 | 2/1986 | Lohman . |
| 4,619,862 | 10/1986 | Sokolowski et al. . |
| 4,676,196 | 6/1987 | Lojek et al. . |
| 4,721,059 | 1/1988 | Lowe et al. . |
| 4,931,139 | 6/1990 | Phillips . |
| 5,082,563 | 1/1992 | Webb et al. ........................ 210/631 |
| 5,188,064 | 2/1993 | House . |
| 5,192,587 | 3/1993 | Rondy . |
| 5,195,465 | 3/1993 | Webb et al. ........................ 119/172 |
| 5,209,186 | 5/1993 | Dewing . |
| 5,215,041 | 6/1993 | Krahenbuhl . |
| 5,358,607 | 10/1994 | Ellis . |
| 5,396,731 | 3/1995 | Byrne . |
| 5,429,741 | 7/1995 | Webb et al. . |
| 5,456,733 | 10/1995 | Hamilton, Jr. . |
| 5,672,434 | 9/1997 | Dalebroux et al. ............... 47/9 X |
| 5,916,027 | 6/1999 | Spittle ............................... 47/9 |
| 5,942,029 | 8/1999 | Spittle ............................... 47/9 X |

*Primary Examiner*—Michael J. Carone
*Assistant Examiner*—Jeffrey L. Gellner
*Attorney, Agent, or Firm*—Price, Heneveld, Cooper, Dewitt & Litton

[57] ABSTRACT

A pourable, granular paper mulch product including a granular solid comprising at least about 85% paper by weight and at least about 6% water by weight, and having a settled density of at least about 15 pounds per cubic foot is prepared by comminuting paper, mixing the comminuting paper with water to form a pulp, extruding the pulp through a die orifice, chopping the extrudate to a length of less than about $\frac{1}{8}$ inch to form granules, and drying the granules to achieve a final moisture content of from about 6% to about 13% by weight. The granular paper mulch product exhibits excellent flow characteristics, and can be easily applied to a damaged area of lawn such as by pouring the patch composition directly from a box.

8 Claims, No Drawings

POURABLE GRANULAR PAPER MULCH COMPOSITION

FIELD OF THE INVENTION

This invention relates to paper mulch compositions for repairing damaged areas of an existing lawn.

BACKGROUND OF THE INVENTION

As is the case with large lawn seed beds, it is also generally desirable to apply a mulch or seed cover material over relatively small areas of lawn which are in need of restoration, such as areas which have been damaged by dog urine, salt burn, utility work, molds, etc., in order to provide a favorable environment for seed germination and seedling development. The mulch or seed cover should desirably stabilize the soil and seed against water and wind erosion, moderate temperature fluctuations at the soil surface to protect germinating seeds and seedlings from temperature induced injury, reduce evaporation from the soil surface to provide a humid environment in and directly above the soil surface, and dissipate the energy of falling water droplets from rainfall and irrigation to prevent crust formation at the soil surface and concomitant reduced water infiltration rates. In addition to meeting all of the above objectives, it is desirable that the mulch be absorbent, easy to apply, free of weed seeds and other objectionable materials which could harm the soil, seeds or seedlings, and be capable of providing a relatively uniform seed bed cover. Desirably, the mulch or seed bed cover will be substantially biodegradable, and will not need to be removed after the grass begins to grow.

Many of the mulch products which have been commonly used over relatively large grass seed beds are particularly unsuitable for repair of small damaged areas or patches. Aside from the normal disadvantages associated with using typical seed covers, such as the difficulty associated with uniformly spreading, and later removing, hay and straw, and the tendency of straw to contain weed seeds, it is also inconvenient to separately acquire, handle and apply grass seed and hay or straw in the relatively small quantities which would be needed for repairing dead patches in an existing lawn.

Other common grass seed covers such as hydro-mulch products would be entirely impractical for small scale patching applications on account of the expensive equipment which would be needed, and because of the difficulty which may be associated with directing hydro-mulch applications over relatively small areas. Additionally, hydro-mulch materials come in 50 pound bales which are difficult, or almost impossible to break up, and apply to a small area.

Dry mulch pellets which are designed to swell, expand and disintegrate upon being exposed to water (rain or irrigation) can be uniformly spread over relatively large areas using various conventional lawn material spreaders. However, it is not practical or convenient to use a lawn spreader to spread dry mulch pellets over small damaged patches in an existing lawn. Also, it is not possible to achieve uniform application of the dry mulch pellets over a small and/or irregularly shaped patch using a conventional spreader without also spreading the pellets over undamaged areas, which results in waste and may be harmful to those portions of the existing lawn which do not need to be reseeded. The dry mulch pellets can be uniformly spread by hand over only the damaged areas of an existing lawn, but this requires a great deal of effort and care. Another disadvantage with using dry mulch pellets for repairing damaged patches on an existing lawn is that the pellets and grass seeds must be applied separately because a mixture of dry mulch pellets and grass seeds will quickly separate, with the grass seeds falling to the bottom of any container holding such a mixture.

A lawn patch product which has been especially developed for restoring damaged areas in an existing lawn is a fluffy mulch product comprised of very finely shredded paper (usually dyed green) which is mixed with grass seed and fertilizer. This product is usually sold in a plastic bag, and is applied by hand. The application technique involves tearing a suitable amount of the mixture from the fluffy mass of material, carefully placing it by hand over a bare spot which is to be restored, and adding water. A disadvantage with this fluffy lawn patch product is that it is generally necessary to add the water immediately after the product has been applied to the lawn to prevent it from being carried away by wind. A further disadvantage with the fluffy mulch product is that it is relatively unsuitable for use in restoring patches of lawn which have been damaged by dog urine. The soil in such areas already has a high urea content. Therefore, any additional fertilizer, rather than being beneficial, is unnecessary and may be harmful to germination and growth of grass seedlings.

Despite efforts to provide products especially developed for restoring small damaged areas in an existing lawn, there nevertheless remains a need for a mulch product which can be more easily and quickly applied, without any special equipment, to relatively small areas of an existing lawn, such as areas damaged by dog urine, or divots on a golf course.

SUMMARY OF THE INVENTION

This invention provides a paper mulch product and a method for making a paper mulch product which can be easily applied to small areas of an existing lawn which are in need of restoration. The paper mulch product, upon application to an area of lawn which is to be restored, provides an environment for promoting seed germination and seedling development. The paper mulch product achieves the desired attributes of stabilizing the soil against water and wind erosion, moderating temperature fluctuations at the soil surface, reducing evaporation and dissipating the energy of falling water droplets. Further, the paper mulch product of this invention is biodegradable and does not need to be removed after the grass begins to grow.

The paper mulch product comprises a granular solid comprising at least about 85% paper by weight and at least about 6% water by weight, with the granular solid having a settled density of at least about 15 pounds per cubic foot.

The method for preparing the paper mulch product includes the steps of comminuting paper to form particles having a maximum dimension of from about ¼ inch to about 1 inch in any direction, mixing the comminuted paper with water to form a pulp, extruding the pulp through a die orifice, chopping the extrudate to a length of less than about ⅛ inch to form granules, and drying the granules to achieve a final moisture content of from about 6% to about 13% by weight.

DESCRIPTION OF THE PREFERRED EMBODIMENTS

The paper mulch products in accordance with the preferred embodiments of this invention are primarily comprised of cellulose fibers derived from paper. Generally, any available source of paper may be used in preparing a paper mulch product in accordance with this invention, including newspaper, office stationary, and the like. However, the products of this invention are most preferably prepared from waste newspaper. Newspaper, especially recycled newspaper, is preferred because of its naturally high absorption capacity for water, because of its availability, and because of its environmental acceptability and biodegradability. Additionally, an added benefit is that newspaper, or other waste paper, can be recycled and utilized in the preparation of an effective, environmentally acceptable, paper mulch product, rather than occupying space in a landfill.

The recycled or used newspaper, or other paper, used in preparing the mulch product is first sorted, such as by hand, to remove any foreign objects which are not acceptable in the finished product. High powered magnets are used to remove any metal items such as staples, paper clips, etc. A metal detector is used to ensure that all unacceptable metal objects have been removed. The paper is then conveyed to a primary hammermill or shredder, where the paper is shredded or chopped into strips which are approximately 2 to 3 inches wide. Thereafter, the shredded strips of paper are conveyed to a secondary shredder which chops the paper into fragments having a maximum dimension of approximately 1 inch in any direction. The chopped up paper is then conveyed to a final shredder in which the paper is shredded or ground to produce paper fragments having a maximum dimension of approximately 5/8 inch in any direction. A surfactant and a dye are preferably added to the ground paper in the final shredder. From the final shredder, the finely chopped paper is blown to a holding tank from which it is metered to a conditioning mill. At the conditioning mill, steam and water are added to raise the moisture content of the ground paper to a range from about 35% to about 45% by weight. The use of steam to raise the moisture content of the chopped paper is desirable because it tends to help break down the paper and provides a product which will break apart more quickly and disperse more evenly over the ground after application and wetting. With the addition of water and steam to the chopped paper, a pulp is formed at the conditioning mill. From the conditioning mill, the pulp is conveyed to a pellet mill. At the pellet mill, the pulp is extruded through a die having a plurality of die orifices, and the extrudates exiting the die orifices are chopped to a length of less than about 1/8 inch to form granules. The temperature of the pulp in the pellet mill is approximately from about 110° F. to 120° F., preferably about 115° F. From the pellet mill, the granules are conveyed to a cooling and aspirating area where water is removed. The granules are dried in the cooling and aspirating area to achieve a final moisture content of from about 6% to about 13% by weight, and more preferably from about 6% to about 8%.

As stated above, a surfactant is preferably added to the paper mulch product to improve the absorption properties of the granules. Specifically, by adding a surfactant to the paper mulch product, the granules thereof are capable of more quickly absorbing water and disintegrating to provide a more uniform seed bed cover after the product is wetted with water (by rainfall or irrigation). Any of a variety of surfactants (surface-active agents) may be acceptable for use in the paper mulch product of this invention, including anionic surfactants, such as those having carboxylate, sulfonate, sulfate or phosphate solubilizing anionic groups; nonionic surfactants, such as polyoxyethylene surfactants, carboxylic acid esters, carboxylic amides, and polyalkylene oxide block copolymers; cationic surfactants, such as amines, 2-alkyl-1-(2-hydroxyethyl)-2-imidazolines, and quaternary ammonium salts; and amphoteric surfactants such as imidazolinium derivatives prepared from 2-alkyl-1-(2-hydroxyethyl)-2-imidazolines and sodium chloracetate. A preferred surfactant for use in preparing the paper mulch product of this invention is a product sold by Technical Products, Inc., Louisville Ky. under the name "Surfonic N-95" and having the chemical name Poly(oxy-1,2-ethanediyl), alpha-(nonylphenyl)-omega-hydroxy. Surfonic N-95 is known to decompose faster than cross-linked polymers.

The amount of surfactant which is added to the paper mulch product should be sufficient to provide a surfactant content of from about 0.1 to about 0.5% by weight, and more preferably from about 0.15 to about 0.35% by weight. Amounts of surfactant below approximately 0.1% by weight are generally undesirable because they do not suitably excellerate or supplement the natural absorbing characteristics of paper, especially newspaper. Amounts of surfactant above about 0.5% by weight are generally undesirable because they do not provide any appreciable added benefit.

As stated above, a dye is preferably added to the paper mulch product in an amount sufficient to impart an aesthetically acceptable green color to the granules. A suitable amount of green dye is generally added, based on the total weight of the mulch. Most preferably, a dye or a combination of dyes are used which will impart to the mulch product a color which resembles that of actual grass, e.g., a Kelly green color. A suitable amount of dye for imparting the desired green color is, for example, about 1 pound per 400 pounds of paper. However, this amount can be higher or lower depending upon the particular dye or dyes being used, the properties of the particular paper or papers being used, and the color which is desired.

As stated above, a combination of steam and water are added to the chopped paper fragments to form a pulp which can be extruded through a die orifice. The relative amount of steam and water are selected to achieve a pulp having a moisture content of from about 35 to 45% by weight and a temperature of about 110 to 120° F. The relatively high moisture content helps lubricate the pellet mill. When the pulp is conveyed to the pellet mill at the above mentioned temperature and moisture ranges, a granular paper mulch product which is well suited for easy application to small areas of an existing lawn which require restoration is achieved.

Suitable pellet mills for use in the practice of this invention include the "series 3000" pellet mills sold by California Pellet Mill Co., Crawfordsville, Ind. The die orifices preferably have a relatively constant diameter entrance portion and a tapered exit portion having a diameter which continuously increases towards the exit end of the orifice. For example, a suitable orifice size is one which has a total length of approximately 2 ½ inches, including a constant diameter entrance portion having a length of approximately 1.25 inches and a diameter of approximately 1/8 inch, and a tapered exit portion which is approximately 1.25 inches long and whose diameter continuously increases from 1/8 inch to 0.265 inches at the exit.

The pellet mill is provided with a plurality of knives which chop the extrudates exiting the die orifices to a desired length. Rotary pellet mills are typically provided with either one or two knives. The length of the pellets are determined by such factors as the rotational rate of the die in the pellet mill, the number of knives, the angular displacement between the knives (when more than one knife is used), and the distance between the outer surface of the die from which the extrudate emerges and the knife blade. In order to form the granular paper mulch products of this invention, it has been found desirable to use at least two knives in the pellet mill, and more preferably from 4 to 8 knives, with about 6 being presently preferred. If too few knives are used, the pellets tend to be too long and too inconsistent in size (i.e., have an undesirably large size distribution). If too many knives are used, the resulting product has an undesirable fluffiness and low density. Fluffy products of this type are undesirable because they do not exhibit good flow properties and therefore cannot be easily poured from a container for easy application onto a relatively small area of an existing lawn which has been damaged. The position of the knives are adjusted so that the cutting edge of the knife blade is approximately from 1/16 inch to approximately ¼ inch from the outer surface of the die from which the extrudates emerge.

The paper mulch product which results from the method described above has a granular appearance. The expression "granular" as used herein refers to a product which has a settled bulk or apparent density similar to a conventional pellet product, but in which the dimensions of the product are smaller than that of conventional pellets. Generally, the individual grains of the granular product of this invention have various sizes and shapes. However, the individual granules of the granular product of this invention should generally have a maximum dimension of less than 1/8 inch in any direction. The granular products of this invention should typically have a settled density of at least 15 pounds per cubic foot, preferably at least 20 pounds per cubic foot, and more preferably at least 25 pounds per cubic foot. Settled density refers to the bulk or apparent density of the product after it has been subjected to sufficient vibration to cause settling thereof.

The granular solid product comprising paper, a small amount of water (e.g., from about 6% to about 13% by weight), and desirably containing a suitable amount of surfactant (i.e., from about 0.1 to about 0.5% by weight) and an amount of a dye which is effective to impart an aesthetically acceptable green color to the product, may be sold in various suitable containers, such as boxes or bags, to the ultimate user, who may mix the granular product with grass seeds prior to application. For example, the owners and/or operators of golf courses generally prefer to use their own blend of grass seeds. Accordingly, the owners and/or operators of golf courses will find it desirable to purchase the granular paper mulch product alone, and mix the granular product with a blend of grass seeds which is preferred. Alternatively, the granular paper mulch product may be premixed with grass seeds and packaged in suitable containers such as boxes or bags for sale to consumers, such as homeowners, who prefer the convenience of a premix. Because of the relatively small size of the granular product, it may be premixed with grass seeds and sold to consumers in that form without any appreciable separation of the seeds from the granular mulch.

The paper mulch products of this invention have the advantage that they exhibit excellent flow properties and can be easily poured from a container, such as directly from the box in which the product is shipped, stored and displayed for retail sale. In one form, the product may be sold as a granular solid comprising paper containing a small amount of water, and optionally containing a small amount of surfactant and/or dye, without any additives or grass seed. This neat granular solid product can be mixed with grass seed or seeds, and with fertilizer and/or other additives if desired prior to application. Owners and operators of golf courses will find this form particularly desirable for preparing lawn patch compositions for repairing small areas of a golf course which has been damaged, such as by divots.

In another form, the granular solid may be premixed with grass seed or seeds to form a patch composition which can be applied directly from the container in which it is sold to a damaged area of lawn. A patch composition containing the granular solid and grass seed or seeds, without fertilizer or other additives, is particularly useful for repairing small areas of a lawn damaged by dog urine.

In another form, the paper mulch product may be sold as a premixed composition containing the granular solid, grass seed or seeds, fertilizer, and other conventional additives if desired. The paper mulch products containing grass or grass seeds and fertilizer may be used for restoring areas of a lawn which have been damaged by various causes (other than dog urine) such as damage due to utility work, molds, etc.

Application of the paper mulch products of this invention is relatively simple. First, it is generally desirable to remove any dead grass and to loosen the soil slightly such as with a rake. Thereafter, the paper mulch products of this invention are simply poured out of a container onto the damaged area of a lawn. Because of the excellent flow properties of the paper mulch products of this invention, application is easier than application of conventional fluffy lawn patch compositions which must be placed over the damaged area, rather than poured over the damaged area. Also, because the paper mulch products of this invention have a higher density than commercially available fluffy paper mulch products, they are not as likely to be blown away by wind, and it is generally not necessary to wet the paper mulch products of this invention immediately after application, as is the case with conventional fluffy lawn patch compositions.

The above description is considered that of the preferred embodiment(s) only. Modifications of the invention will occur to those skilled in the art and to those who make or use the invention. Therefore, it is understood that the embodiment(s) shown in the drawings and described above are merely for illustrative purposes and not intended to limit the scope of the invention, which is defined by the following claims as interpreted according to the principles of patent law, including the doctrine of equivalents.

What is claimed is:

1. A paper mulch product comprising:
   a granular solid comprising at least about 85% paper by weight, from about 6% to about 13% water by weight, and a surfactant in an amount of from about 0.1% to about 0.5% by weight, the granular solid having a settled density of at least about 15 pounds per cubic foot.

2. The paper mulch product of claim 1, wherein the granular solid is comprised of granules having an average maximum dimension of about 1/8 or less.

3. The paper mulch product of claim 1, wherein the granular solid has a surfactant content of from about 0.15% to about 0.35% by weight.

4. The paper mulch product of claim 1 in which the granular solid contains an amount of dye which is effective to impart a green color to the granules.

5. The paper mulch product of claim 1, wherein the granular solid has a water content of from about 6% to about 8% by weight.

6. The paper mulch product of claim 1 further comprising grass seeds mixed with the granular solid.

7. The paper mulch product of claim 1 further comprising fertilizer mixed with the granular solid.

8. The paper mulch product of claim 1 further comprising grass seed and fertilizer mixed with the granular solid.

* * * * *